United States Patent [19]
Gauthier

[11] Patent Number: 5,012,723
[45] Date of Patent: May 7, 1991

[54] BRAKE BOOSTER

[75] Inventor: Jean-Pierre Gauthier, Aulnay Sous Bois, France

[73] Assignee: Bendix France, Drancy, France

[21] Appl. No.: 341,520

[22] Filed: Apr. 21, 1989

[30] Foreign Application Priority Data

Apr. 28, 1988 [FR] France ................. 88 05657

[51] Int. Cl.⁵ ............................................. F15B 13/16
[52] U.S. Cl. ................................. 91/369.21; 91/376 R
[58] Field of Search ................ 91/369.2, 376 R, 369.4

[56] References Cited

U.S. PATENT DOCUMENTS 4,671,167 6/1987 Endo et al. ...................... 91/369 A

FOREIGN PATENT DOCUMENTS 3137971 3/1983 Fed. Rep. of Germany ..... 91/369.2
1560915 3/1969 France .
0202146 11/1983 Japan ................................ 91/369.2
2104989 3/1983 United Kingdom .

Primary Examiner—William E. Wayner
Attorney, Agent, or Firm—Larry J. Palguta; Ken C. Decker

[57] ABSTRACT

The invention relates to a brake booster of the type for motor vehicles comprising a casing and a diaphragm which divides the interior of the casing (5) sealingly into a front chamber and a rear chamber, a hollow piston (10) movable in the casing, an input member (14, 16) intended to be connected to a brake pedal (18), an output assembly (20, 26) intended to be connected to a piston of a master cylinder, and a reaction disk (32) made of a deformable material and arranged between the hollow piston (10) and the output assembly (20, 26), in order to receive the output force of the booster when it is put into operation, the output force causing a first deformation of the reaction disk (32), this deformation tending to push back the input member (14, 16). According to the invention, the output assembly (20, 26) is formed in two parts, one movable relative to the other counter to a spring means (36), in order to act on a reduced surface of the reaction disk (32).

7 Claims, 2 Drawing Sheets

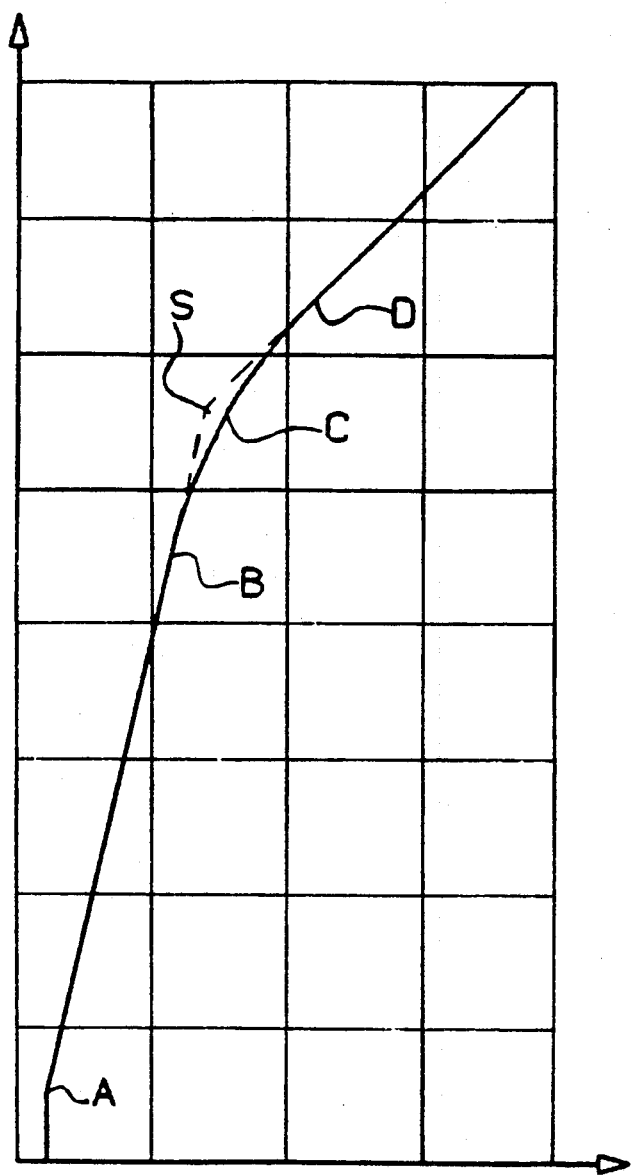
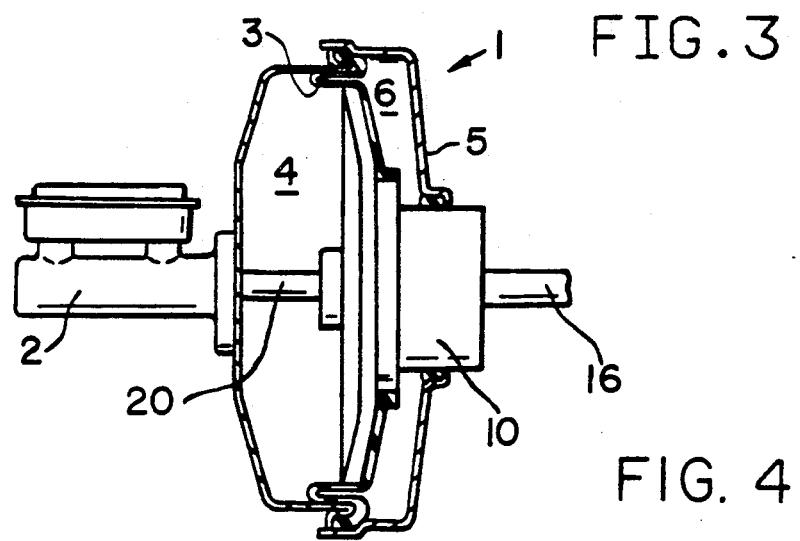
FIG. 3
FIG. 4

BRAKE BOOSTER

The invention relates to a brake booster and advantageously applies to motor vehicles.

A brake booster of conventional design, for example that described in the document FR-A-2,442,984, comprises a casing and a diaphragm which divides the interior of the casing sealingly into a front chamber and a rear chamber, a hollow piston movable in the casing, an input member intended to be connected to a brake pedal, an output assembly intended to be connected to a piston of a master cylinder, and a reaction disk made of a deformable material and arranged between the hollow piston and the output assembly, in order to receive the output force of the booster when it is put into operation, the output force causing a first deformation of the reaction disk, this deformation tending to push back the input member.

With such a booster, during heavy braking, there comes a moment when the valve means controlling the passage of air towards the rear chamber is completely open. The pressure in the rear chamber becomes equal to that of the atmospheric air, and there is therefore no longer any boost provided by the booster. If braking continues beyond this point, called the saturation point, the increase in the input force is substantially equal to the increase in the output force of the booster. Some motor-vehicle manufacturers would like the change from the boosted phase of the booster to the non-boosted phase, that is to say the passage of the saturation point, to be more progressive.

An object of the present invention is, therefore, to provide a brake booster, in which the passage of the saturation point is more progressive.

According to the invention, this result is obtained by means of the output assembly which is formed from two parts, one movable relative to the other counter to a spring means, in order to act on a reduced surface of the reaction disk.

The invention will now be described by way of example with reference to the accompanying drawings in which.

FIG. 3 gives a curve for the booster according to the invention, the input force being shown on the abscissa and the output force on the ordinate; and FIG. 4 is a schematic illustration of the brake booster of the present invention.

Figure 1:
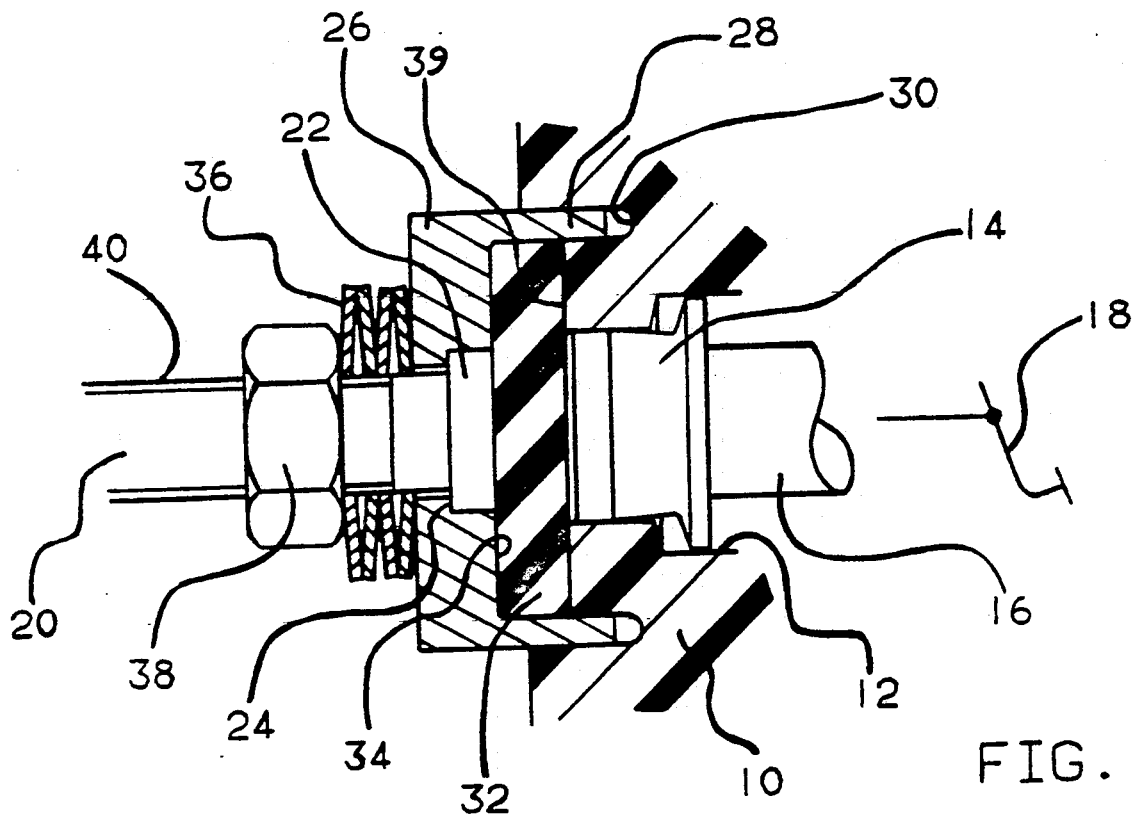
FIG. 1 is a view in longitudinal section of part of a brake booster produced according to the invention.

FIG. 1 and 4 illustrates the central part of a brake booster 1 intended to be placed in the conventional way between the brake pedal of a vehicle and the master cylinder 2 controlling the hydraulic brake circuit. By convention, that part of the booster facing the master cylinder is called its front part and that part facing the brake pedal is called its rear part.

The part of the booster illustrated in FIG. 1 comprises a hollow piston 10 intended to be mounted axially and movably inside the casing 5 of the booster 1 and for receiving an inner peripheral edge of a flexible diaphragm 3 dividing the interior of the casing into a front chamber 4 and a rear chamber 6. The hollow piston 10 has a stepped axial bore 12, in which is mounted slideably a plunger 14 intended to be connected to the brake pedal 18 by means of an input rod 16. The plunger 14 and the input rod 16 together form an input member.

The booster also possesses an output rod 20, one end of which is intended to be received in an orifice made in a piston of a master cylinder (not shown). The other end of the output rod 20 comprises a widened head 22 which is received in a stepped orifice 24 made in a cover 26, the whole forming an output assembly. The cover 26 is substantially cup-shaped and has an annular edge 28 which is received in an annular groove 30 made in the hollow piston 10 round the stepped bore 12. Arranged inside the cover 26 is a reaction disk 32 made of a deformable material, such as rubber. The disk 32 comes up against the inner surface 34 of the cover and up against the front surface 39 of the hollow piston 10.

The widened head 22 of the output rod 20 is kept pressed against the abutment of the stepped orifice 24 by means of a series of Belleville washers 36, four in the example illustrated, which are arranged round the output rod between the cover 26 and a stop nut 38 mounted in a stationary manner on the output rod 20. The nut 38 is mounted on a threaded part 40 of the output rod 20, so as to make it possible to adjust the compression of the Belleville washers 36.

The booster thus described operates in the following way: When the driver presses on the brake pedal 18, the input rod 16 moves forwards and a conventional valve means (not shown) isolates the rear chamber from a vacuum source and puts it in communication with the atmospheric air. The pressure difference thereby generated between the rear chamber and the front chamber acts on the hollow piston 10 and on the flexible diaphragm and pushes them forwards. The hollow piston 10 causes the movement of the cover 26 and of the output rod 20 by means of the reaction disk 32. When the force exerted on the reaction disk 32 begins to increase, the disk is compressed between the front surface of the hollow piston 10 and the inner surface 34 of the cover 26, the annular edge 28 penetrating into the annular groove 30. The reaction disk 32 is therefore compressed and progressively deformed, producing a projection which protrudes into the stepped bore 12 towards the plunger 14. Beyond a certain threshold represented by the point A on the curve of FIG. 3, the reaction disk 32 is deformed in a way known per se and has a protuberance which comes to bear on the front surface of the plunger 14 towards the rear. This condition is represented by the point A on the curve of FIG. 3, a first reaction force on the brake pedal 18 thus being generated.

Figure 2:
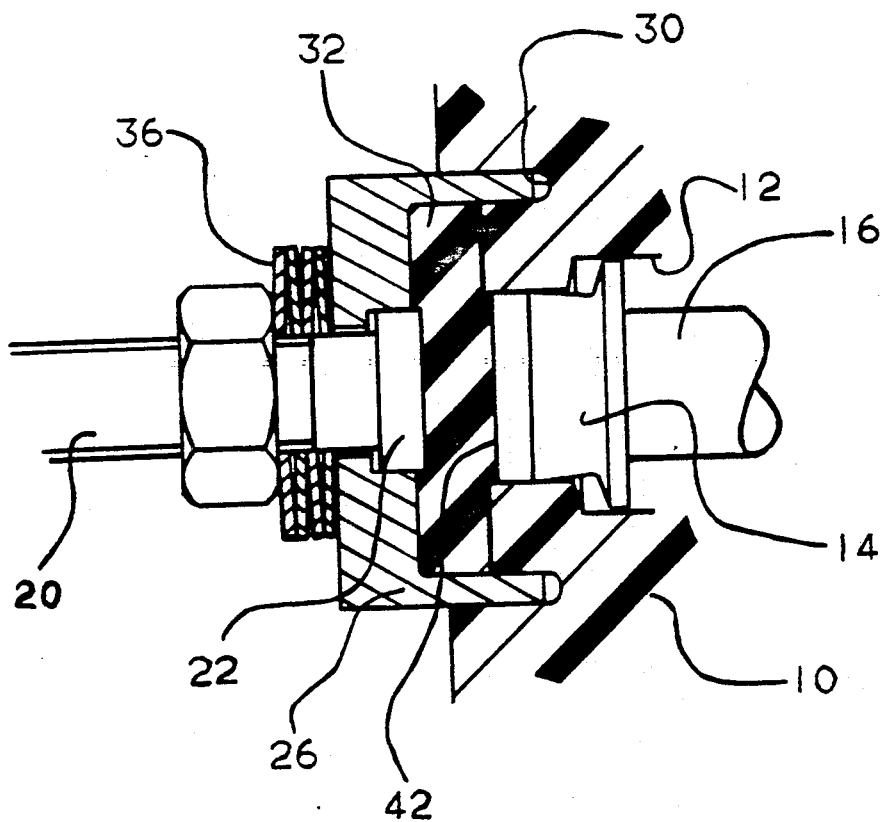
FIG. 2 is a view similar to that of FIG. 1 and shows the booster in an operating position.

If braking continues, the force on the output rod 20 will continue to increase. Beyond a second threshold represented by the point B on the curve of FIG. 3, the Belleville washers 36 begin to be crushed, allowing a relative movement between the output rod 20 and the cover 26. As shown in FIG. 2, the widened head 22 of the output rod 20 presses progressively into the reaction disk 32, giving rise, as result of the deformation of the disk, to a second increase in the protuberance of material 42 which protrudes into the bore 12 and which tends to push the plunger 14 further back. A second reaction force on the brake pedal 18 is thus added to the first generated. This condition is represented by the point C on the curve of FIG. 3.

Thus, according to the invention, because there is the output assembly 20, 26 formed from two parts, one movable relative to the other counter to a spring means, it becomes possible to improve the characteristics of the booster, particularly that of the pedal reaction.

It is possible to vary the cross-section of the widened head 22 laid against the reaction disk, for the purpose of modifying the deformation of the reaction disk. However, it is preferable that the surface of the widened head is substantially less than that of the plunger 14. Moreover, it is possible for the spring means to be different from a series of Belleville washers, for example a helical spring.

Thus, if the curve for a conventional booster, as represented by dashes in FIG. 3, is considered, it will be seen that there is a distinct cutoff S at the present moment of passage to the saturation point. In contrast, by means of the invention, the passage from boosted braking to saturation is progressive, as represented by the section BCD of the curve of FIG. 3.

I claim:

1. A brake booster comprising a casing and a diaphragm which divides sealingly an interior of the casing into a front chamber and a rear chamber, a hollow piston movable in the casing, an input member intended to be connected to a brake pedal, an output assembly intended to be connected to a piston of a master cylinder, a reaction disk made of a deformable material and arranged between the hollow piston and the output assembly in order to receive an output force of the booster when the booster is put into operation, the output force causing a first deformation of the reaction disk, the deformation tending to push back the input member, said output assembly being formed from two parts, one part movable relative to the other part and counter to spring means, in order to act on a reduced surface of the reaction disk, wherein the one part of the two parts of said output assembly is mounted slideably inside the other part, and the other part axially and slideably engaging the hollow piston to be freely displaceable according to forces acting upon the other part.

2. The booster of claim 1, wherein the other part of the two parts is substantially cup-shaped, the reaction disk being arranged inside the cup, the one part being in the form of a rod passing through an orifice in the cup.

3. The booster of claim 2, wherein said orifice is stepped, the rod having a widened head which is received in the stepped orifice and which bears on the reaction disk.

4. The booster of claim 3, wherein the surface of the widened head presented to the reaction disk is substantially less than that of the input member.

5. The booster of claim 2, wherein the cup comprises a cover with an annular, axially extending wall slideably received within an axial groove in the hollow piston.

6. The booster of claim 2, wherein the spring means comprises Belleville washers arranged around the rod and between the cup and an abutment on the rod.

7. The booster of claim 1, wherein means for adjusting the force of the spring means is provided.

* * * * *